United States Patent [19]
Takemoto et al.

[11] Patent Number: 5,652,320
[45] Date of Patent: Jul. 29, 1997

[54] POLYMER CONTAINING N-SULFOAMINO GROUP, FIBER FORMED THEREFROM, AND MAGNETIC RECORDING MEDIUM CONTAINING THE SAME

[75] Inventors: Takashi Takemoto, Kameoka; Toshiro Shimada, Kusatsu; Hiroshi Itayama, Ohtsu, all of Japan

[73] Assignee: Sanyo Chemical Industries, Ltd., Kyoto, Japan

[21] Appl. No.: 538,455

[22] Filed: Oct. 3, 1995

[30] Foreign Application Priority Data

Oct. 11, 1994 [JP] Japan .................................. 6-272997
Mar. 8, 1995 [JP] Japan .................................. 7-078238

[51] Int. Cl.$^6$ .................................................. C08G 18/28
[52] U.S. Cl. .................................. 528/71; 528/84; 528/85; 528/272; 528/288; 528/290; 528/291; 528/292; 528/299; 528/300; 528/302; 528/306; 528/307; 528/308; 528/308.6; 428/411.1; 428/480; 252/62.54
[58] Field of Search ......................... 528/71, 84, 85, 528/272, 288, 290, 291, 292, 299, 300, 302, 306, 307, 308, 308.6; 428/425, 411, 480; 252/62.54

[56] References Cited

U.S. PATENT DOCUMENTS 4,152,485  5/1979  Mizumura et al. ...................... 428/425

FOREIGN PATENT DOCUMENTS 0465070  6/1991  European Pat. Off. .
1450949  7/1966  France .
256719   2/1990  Japan .

OTHER PUBLICATIONS

Santerre et al., "Microstructure of Polyurethane Ionomers Derivatized with Dodecylamine and Polyethylene Oxide in the Hard Segment", Journal of Applied Polymer Science, vol. 52, No. 4, pp. 515–523, Apr. 25, 1994.

Databas WPI, Week 7045.

European Search Report.

*Primary Examiner*—Samuel A. Acquah
*Attorney, Agent, or Firm*—Oblon, Spivak, McClelland, Maier & Neustadt, P.C.

[57] ABSTRACT

The present invention provides an novel polymer having 1–2,000 equivalents of an N-sulfoamino group/$10^6$ g of weight of the polymer.

The polymer has excellent dispersibility of inorganic fine particles, hygroscopicity, and dye-affinity. The polymer provides a binder resin in which a magnetic or non-magnetic metal or metal oxide can highly be dispersed. The polymer also provides a magnetic recording medium which is excellent in electromagnetic conversion characteristic, surface smoothness, adhesion to non-magnetic substrates, and durability. The polymer provides a magnetic recording medium with improved travelling, travelling durability, signal-to-noise ratio, and drop-out. The polymer also provides a polyester fiber which has a high fiber strength and an excellent hygroscopicity and can be colored with cationic dyes.

16 Claims, No Drawings

POLYMER CONTAINING N-SULFOAMINO GROUP, FIBER FORMED THEREFROM, AND MAGNETIC RECORDING MEDIUM CONTAINING THE SAME

BACKGROUND OF THE INVENTION

1. Field of the Invention

The present invention relates to a novel polymer and a magnetic recording medium such as an audio tape, a video tape, a computer tape, a data-recorder tape, a video sheet, a metal tape, a metal disk, or a magnetic card in which that polymer is used for forming a magnetic layer thereof, and a polyester fiber made from the novel polymer with improved dye-affinity and hygroscopicity.

2. Related Background Art

Conventionally, polyurethane resins, polyester resins, nitrocellulose, vinyl chloride/vinyl acetate copolymer, vinyl chloride/vinyl acetate/vinyl alcohol copolymer, and the like have been used as binder resins for magnetic recording media. As magnetic powders have recently been made with a finer particle and a higher magnetic force to meet higher performances required in the current magnetic recording media, however, it has become difficult for the above-mentioned binder resins to attain sufficiently dispersibility of the magnetic powder, surface smoothness, and durability in the magnetic powder. Accordingly, in order to correspond with finer particles of magnetic powder, U.S. Pat. No. 4,452,485 proposed a polyester resin or polyurethane resin having a metal sulfonate group. This resin has practically been in use. Also, recently, Japanese Laid Open Patent Application No. 2-56716 proposed to use a polyester resin or polyurethane resin having a sulfobetaine structure expressed by formula of $>N<(R)_n—SO_3$, as a binder resin for a magnetic layer of a magnetic recording medium, to improve the dispersibility of magnetic powders.

However, while these binder resins may improve the dispersibility of magnetic powders, they are still unsatisfactory.

Though the conventional polyester fibers may be colored with disperse dyes, it may be difficult for other types of dyes to color them. Since aromatic polyesters containing sulfoisophthalic acid can be colored with cationic dyes, they are currently in use for making polyester fibers with improved dye-affinity. However, since such polyesters remarkably increase their viscosity as polymerization proceeds, it is difficult for them to attain a high degree of polymerization. Accordingly, the strength of fiber cannot be increased considerably. Also, since the polyester fibers thus formed cannot absorb sweat due to their low hygroscopicity, they are unsatisfactory as a material for clothing. Therefore, there has been a commercial demand for a polyester fiber having an excellent hygroscopicity.

SUMMARY OF THE INVENTION

In view of the foregoing, the object of the present invention is to provide a polymer having a novel structure which is excellent in dispersibility of inorganic fine particles, hygroscopicity, and dye-affinity.

Another object of the present invention is to provide a binder resin in which a magnetic or non-magnetic metal or metal oxide can highly be dispersed.

Still another object of the present invention is to provide a magnetic recording medium which is excellent in electromagnetic conversion characteristic, surface smoothness, adhesion to non-magnetic substrates, and durability.

A further object of the present invention is to provide a magnetic recording medium with improved travelling, travelling durability, signal-to-noise ratio, and drop-out.

A still further object of the present invention is to provide a polyester fiber which has a high fiber strength and an excellent hygroscopicity and can be colored with cationic dyes.

In one aspect, the present invention provides a polymer having 1–2,000 equivalents of an N-sulfoamino group/$10^6$ g of weight of the polymer.

In another aspect, the present invention provides a magnetic recording medium comprising a magnetic layer which contains the above-mentioned polymer and a magnetic powder.

In still another aspect, the present invention provides a magnetic recording medium comprising a back-coat layer which contains the above-mentioned polymer and a non-magnetic pigment.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

The polymer containing an N-sulfoamino group in accordance with the present invention may be any polymer containing an N-sulfoamino group in a molecule thereof. Examples of such a polymer include polyurethane resins containing an N-sulfoamino group, polyester resins containing an N-sulfoamino group, polyamide resins containing an N-sulfoamino group, and vinyl polymers containing an N-sulfoamino group (e.g., acrylic resins containing an N-sulfoamino group and vinyl chloride resins containing an N-sulfoamino group). However, it may be necessary for these polymers to contain 1–2,000 equivalents of an N-sulfoamino group/$10^6$ g of the resin in their molecule. When such a resin is used as a binder resin for making a magnetic recording medium, that preferably having 5–500 equivalents/$10^6$ g or, more preferably, 10–300 equivalents of an N-sulfoamino group/$10^6$ g of resin is used. When a polyester resin containing an N-sulfoamino group is used for making a polyester fiber, that preferably having 50–1,800 equivalents of an N-sulfoamino group/$10^6$ g or, more preferably, 100–500 equivalents/$10^6$ g of resin may be used. The N-sulfoamino group is expressed by formula of $>N—SO_3X$ wherein X is a member selected from the group consisting of hydrogen ion, alkali metal ion (e.g., lithium ion, sodium ion, and potassium ion), ammonium ion, and N-substituted ammonium ion (e.g., alkyl ammonium ion and alkanol ammonium ion having a carbon number of 1–10). Preferably, X may be sodium ion or potassium ion.

When the amount of the N-sulfoamino group is less than 1 equivalent/$10^6$ g of resin, the dispersibility of inorganic fine particles such as magnetic powders therein may decrease and its dye-affinity may become insufficient. On the other hand, when this amount exceeds 2,000 equivalents/$10^6$ g of resin, the viscosity of the resin as a coating material becomes so high that its workability may deteriorate or its fiber strength may decrease.

A polyurethane resin containing an N-sulfoamino group may be obtained when an active hydrogen compound containing an N-sulfoamino group is reacted with a polyisocyanate according to a known method, if necessary, together with an active hydrogen compound containing no N-sulfoamino group.

Examples of the active hydrogen compound containing an N-sulfoamino group include, as a polyol type, low molecular weight diols containing an N-sulfoamino group such as a sodium or potassium salt of 2-N-sulfoamino-1,3-propanediol, a sodium or potassium salt of 3-N-sulfoamino-1,2-propanediol, a sodium or potassium salt of 2-N-sulfoamino-2-methyl-1,3-propanediol, a sodium or potassium salt of N-sulfodiethanolamine, and a sodium or potassium salt of N,N'-bis(4-hydroxychlorohexyl) sulfamic acid, and a sodium or potassium salt of N,N'-bis(p-hydroxycyclohexyl) sulfamic acid as well as polyether polyols, polyester polyols, polyether ester polyols, and acrylic polyols containing such a group.

Examples of the polyether polyol containing an N-sulfoamino group include random- or block-addition products of alkylene oxides (e.g., ethylene oxide and propylene oxide) to the above-mentioned low molecular weight diols containing an N-sulfoamino group. In general, 2–50 mol of such an alkylene oxide is added.

As disclosed in Journal of Organic Chemistry, vol. 23, page 1173 (1958), a low molecular weight diol containing an N-sulfoamino group is formed, for example, when a polyol containing an amino group is reacted with pyridine/sulfur trioxide complex in an aqueous alkali solution at a temperature of about 0°–40° C. and then the reaction product is obtained by the recrystallization from ethanol or acetone.

An alkylene oxide addition product of a low molecular weight polyol containing an N-sulfoamino group is obtained when such a polyol is reacted with an alkylene oxide in the presence of an alkali catalyst such as potassium hydroxide.

Examples of the polyester polyol containing an N-sulfoamino group include aromatic polyester polyols, alicyclic polyester polyols, and aliphatic polyester polyols containing such a group. Such a polyester polyol may be obtained when the above-mentioned polyol containing an N-sulfoamino group is subjected to a polycondensation reaction with a polyhydric carboxylic acid or hydroxycarboxylic acid according to a known method, if necessary, together with other known polyols. Alternatively, it is obtained when a polyhydric carboxylic acid or hydroxycarboxylic acid containing an N-sulfoamino group is subjected to a polycondensation reaction with a polyol according to a known method, if necessary, together with other known polyhydric carboxylic acids or hydroxycarboxylic acids.

Examples of the polyhydric carboxylic acid containing an N-sulfoamino group include 2-N-sodiosulfoaminoterephthalic acid, 3-N-sodiosulfoaminophthalic acid, and 5-N-sodiosulfoaminoisophthalic acid.

Examples of the hydroxycarboxylic acid containing an N-sulfoamino group include 2-hydroxyl-4-N-sulfoaminobenzoic acid, 2-hydroxyethyl-4-N-sulfoaminobenzoic acid, 3-hydroxyl-2-N-sulfoaminobenzoic acid, and 3-hydroxyethyl-2-N-sulfoaminobenzoic acid.

Such a carboxylic acid may be obtained, for example, when a carboxylic acid containing an amino group is reacted with pyridine/sulfur trioxide complex in an aqueous alkali solution at a temperature of about 0°–40° C. and then the reaction product is obtained by the recrystallization from ethanol or acetone.

Examples of other polyols used for making the polyester polyol containing an N-sulfoamino group include alkylene glycol (e.g., ethylene glycol, diethylene glycol, trimethylene glycol, propylene glycol, dipropylene glycol, 1,4-butanediol, 1,3-butanediol, neopentyl glycol, 1,6-hexanediol, 1,8-octanediol, and 1,10-decanediol); low molecular weight diols having a cyclic group {e.g., glycols such as cyclohexanediol and cyclohexane dimethanol and those disclosed in Japanese Patent Publication No. 45–1474 [e.g., xylylene glycol, bis(hydroxyethyl)benzene, 1,4-bis(2-hydroxyethoxy)benzene, and 4,4'-bis(2-hydoroxyethoxy)-diphenylpropane (i.e., 2-mol ethylene oxide addition product of bisphenol A)]}; and trihydric or higher polyhydric alcohols such as trimethylolethane, trimethylolpropane, glycerine, and pentaerythritol as well as their alkylene oxide addition products and mixtures of two or more thereof.

Examples of other polyhydric carboxylic acids used for making the polyester polyol containing an N-sulfoamino group include aromatic dicarboxylic acids (e.g., terephthalic acid, isophthalic acid, phthalic acid, 1,5-naphthalene dicarboxylic acid, and 1,8-naphthalic acid); aliphatic dicarboxylic acids (e.g., succinic acid, adipic acid, azelaic acid, sebacic acid, dimer acid, dodecane dicarboxylic acid, and 1,4-cyclohexane dicarboxylate); trivalent or higher carboxylic acids (e.g., trimellitic acid, trimesic acid, and pyromellitic acid); and mixtures of two or more thereof. Examples of the hydroxycarboxylic acids include aromatic hydroxycarboxylic acids [e.g., p-hydroxybenzoic acid and p-(hydroxyethoxy)benzoic acid] and aliphatic hydroxycarboxylic acids (e.g., hydroxycaproic acid).

Examples of the polyether ester polyol containing an N-sulfoamino group include aromatic polyether ester polyols, alicyclic polyether ester polyols, and aliphatic polyether ester polyols containing such a group. Such a polyether ester polyol may be obtained when the above-mentioned polyether polyol containing an N-sulfoamino group is subjected to a polycondensation reaction with a polyhydric carboxylic acid according to a known method, or when the above-mentioned diols containing an N-sulfoamino group and known polyether polyol i subjected to a polycondensation reaction with a polyhydric carboxylic acid according to a known method. Alternatively, it may be obtained when a polyhydric carboxylic acid or hydroxycarboxylic acid containing an N-sulfoamino group is subjected to a polycondensation reaction with a polyether polyol according to a known method.

Examples of the acrylic polyol containing an N-sulfoamino group include copolymers made from hydroxyalkyl (meth)acrylate and N-sodiosulfo N-allylethanolamine or N-sodiosulfo N-methylethyl (meth) acrylate.

Such a polyol may be obtained when the above-mentioned monomers are radically polymerized. Alternatively, it may be obtained when a copolymer made from a hydroxyalkyl (meth)acrylate and a vinyl monomer having a primary or secondary amino group is reacted with pyridine/sulfur trioxide complex.

Examples of the active hydrogen compound containing an N-sulfoamino group include, as a polyamine type, a sodium or potassium salt of bisaminopropyl sulfamic acid, a sodium or potassium salt of 2-N-sulfoamino-1,3-bisaminopropoxypropane, N-sodiosulfoaminophenylenediamine, 1,3-bis (aminoethoxy)-2-sulfoaminopropane, and polyether polyamines containing an N-sulfoamino group.

Examples of the polyether polyamine containing an N-sulfoamino group include a sodium or potassium salt of α,ω-bis(aminopropyl)polyoxyethyl-2-N-sulfoaminopropane and a sodium or potassium salt of α,ω-bis(aminopropyl)polyoxypropyl-2-N-sulfoaminopropane.

Such a polyamine containing an N-sulfoamino group may be obtained when a nitropolyamine is reduced by a sulfite. Alternatively, it may be obtained when a metal sulfamate or a polyol containing an N-sulfoamino group is subjected to cyanoethylation and then the resulting nitrile group is reduced.

In general, the above-mentioned active hydrogen compounds to be used have a number average molecular weight of not more than 5,000 or, preferably, within the range of 500–4,500.

Examples of the active hydrogen compounds containing no N-sulfoamino group used for making the polyurethane resin containing an N-sulfoamino group include known polyols, polyamines, and aminoalcohols having a number average molecular weight of less than 500 as well as polyester polyols, polyether polyols, and polyamines having a number average molecular weight of not less than 500.

Examples of the polyols which contain no N-sulfoamino group and have a number average molecular weight of less than 500 include the same polyols used for making the above-mentioned polyester polyols containing an N-sulfoamino group.

Examples of the polyamines which contain no N-sulfoamino group and have a number average molecular weight of less than 500 include hydrazine, ethylenediamine, isophoronediamine, and 4,4'-diaminodicyclohexylmethane.

Examples of the aminoalcohols which contain no N-sulfoamino group and have a number average molecular weight of less than 500 include ethanolamine.

Examples of the polyester polyol s having a number average molecular weight of not less than 500 include polyester polyols obtained by a ring open condensation reaction of a polyhydric alcohol (ethylene glycol, 1,4-butanediol, or the like) and a polyhydric carboxylic acid (adipic acid, phthalic acid, or the like) as well as polylactone polyols which are obtained by a cyclopolymerization of lactone in which a polyhydric alcohol (ethylene glycol, trimethylol propane, or the like) is used as an initiator and polycarbonate polyols.

Examples of the polycarbonate polyols include polycarbonate polyols obtained by a polycondensation reaction of 1,6-hexanediol with diethyl carbonate or diphenyl carbonate.

Examples of the polyether polyols having a number average molecular weight of not less than 500 include polyethylene ether polyols, polypropylene ether polyols, polytetramethylene ether polyols, and polyether polyols obtained by their (random or block) copolymerization.

Examples of organic polyisocyanates include aromatic diisocyanates [e.g., 1,3- or 1,4-phenylene diisocyanate (PDI), 2,4- or 2,6-toluene diisocyanate (TDI), and 4,4'- or 2,4'-diphenylmethane diisocyanate (MDI)]; aliphatic diisocyanates [e.g., hexamethylene diisocyanate (HDI) and tetramethylxylylene diisocyanate (TMXDI)]; alicyclic diisocyanates [e.g., isophorone diisocyanate (IPDI) and dicyclohexylmethane diisocyanate (hydrogenated MDI)]; denatured polyisocyanates (e.g., biuret product of hexamethylene diisocyanate and trimer of isophorone diisocyanate); and mixtures of two or more thereof.

The polyurethane resin containing an N-sulfoamino group can be manufactured by known methods. For example, it is obtained when active hydrogen compounds including an active hydrogen compound containing an N-sulfoamino group are reacted with an organic polyisocyanate in or without the presence of a solvent, if necessary, with a catalyst, with the equivalent ratio between the active hydrogen compound and organic polyisocyanate being normally held at 0.6–1.5 or, preferably, at 0.8–1.2, at a reaction temperature normally within the range of 30°–180° C. or, preferably, of 60°–120° C. When the equivalent ratio is less than 0.6 or more than 1.5, the molecular weight of the polyurethane resin becomes so low that its mechanical strength, abrasion resistance, scratch resistance, or hydrolysis resistance may decrease.

Examples of such a solvent include ester solvents (e.g., ethyl acetate and butyl acetate), ether solvents (e.g., dioxane and tetrahydrofuran), ketone solvents (e.g., cyclohexanone, methyl ethyl ketone, and methyl isobutyl ketone), aromatic hydrocarbon solvents (e.g., toluene and xylene), and mixed solvents of two or more thereof.

Examples of such a catalyst include tin catalysts (e.g., trimethyltin laurate, trimethyltin hydroxide, dimethyltin dilaurate, dibutyltin dilaurate, and stannous octoate) and lead catalysts (e.g. lead oleate and lead octylate).

The polyurethane resin to be used has a number average molecular weight of at least 3,000 or, preferably, of at least 5,000. When the number average molecular weight is less than 3,000, the mechanical characteristics of the resin decrease such that durability becomes low when used in a magnetic layer of a magnetic recording medium. When used as a binder resin for magnetic recording media, it may be preferable for the resin to have a number average molecular weight of 5,000–200,000 in view of the dispersibility of inorganic fine particles such as magnetic powders therein.

When the polyurethane resin which contains an N-sulfoamino group and has a number average molecular weight of less than 3,000 is used, a known polyurethane resin may be preferably compounded therein.

Examples of the polyester resin containing an N-sulfoamino group include aromatic polyester resins, alicyclic polyester resins, and aliphatic polyester resins containing such a group. Among others, the aromatic polyester resins containing an N-sulfoamino group are preferable.

The polyester resin containing an N-sulfoamino group may be obtained when the above-mentioned polyol containing an N-sulfoamino group and a polyhydric carboxylic acid, if necessary, together with other polyols, are subjected to polycondensation by a known method, e.g., at a temperature of about 170°–250° C., and then further subjected to a polycondensation reaction in a vacuum of 0.5–1.0 mmHg at a temperature of about 150°–250° C. Alternatively, it may be obtained when the above-mentioned polyhydric carboxylic acid or hydroxycarboxylic acid and a known polyol, if necessary, together with other known polyhydric carboxylic acids, are subjected to a polycondensation reaction under the above-mentioned condition.

Examples of other polyols and polyhydric carboxylic acids and hydroxycarboxylic acids used for making the polyester resin containing an N-sulfoamino group include those used for making the polyester polyol containing an N-sulfoamino group.

When used as a binder resin for magnetic recording media, the polyester resin containing an N-sulfoamino group should have a number average molecular weight of at least 3,000 or, preferably, of at least 5,000. When the number average molecular weight is less than 3,000, the mechanical characteristics of the resin decrease such that durability becomes low when used in a magnetic layer of a magnetic recording medium. When used as a binder resin for magnetic recording media, it is preferable for the resin to have a number average molecular weight of 5,000–200,000 in view of the dispersibility of inorganic fine particles such as magnetic powders therein.

When the polyester resin which contains an N-sulfoamino group and has a number average molecular weight of not more than 3,000 is used, a known aromatic polyester resin is preferably compounded therein.

When the polyester resin containing an N-sulfoamino group is used in a fiber, that obtained when a diol containing an N-sulfoamino group, an alkylene glycol, and an aromatic dicarboxylic acid are reacted together is preferable. Such a diol should preferably have an oxyethylene unit in order to further increase the hygroscopicity. The number of units is normally 5–50 or, preferably, 10–30.

The intrinsic viscosity of the polyester resin containing an N-sulfoamino group used for making fibers is not less than 0.4 dl/g or, preferably, not less than 0.5 dl/g when determined in a mixed solvent of phenol and tetrachloroetane [with a mixing ratio of 60/40 (by weight)].

The polyester fiber in accordance with the present invention may be obtained when the polyester resin containing an N-sulfoamino group is spun by a known method or, preferably, by melt spinning. For example, the polyester resin containing an N-sulfoamino group is melted at a temperature higher than its melting point by 30°–50° C., injected from a nozzle having at least one spinning hole, wound at a take-off speed of several hundred to 5,000 m/minute or, preferably, of 1,000–3,000 m/minute, extended at a preheating temperature of about 80° C. so as to attain a rupture ductility of about 10 to about 50%, and then thermally set at a temperature of about 130° C. to yield a fiber of 0.5–5 deniers.

Examples of the polyamide resin containing an N-sulfoamino group include aromatic polyamide resins, alicyclic polyamide resins, and aliphatic polyamide resins containing such a group. The polyamide resin containing an N-sulfoamino group is obtained when the above-mentioned polyhydric carboxylic acid containing an N-sulfoamino group and a known polyamine, if necessary, together with other carboxylic acids, are subjected to a polycondensation reaction by a known method, for example, at a temperature of about 170°–250° C. in a vacuum of 0.5–1.0 mmHg.

Examples of other polyhydric carboxylic acid ingredients used for making the polyamide resin containing an N-sulfoamino group include those used for making the polyester polyols containing an N-sulfoamino group.

Examples of known polyamines include aliphatic polyamines [alkylene (with a carbon number of 2–6) diamines (e.g., ethylenediamine, propylenediamine, and hexamethylenediamine) and polyalkylene polyamines (e.g., diethylenetriamine, dipropylenetriamine, and triethylenetetramine)]; alicyclic polyamines (e.g., cyclohexylenediamine, isophoronediamine, diaminodicyclohexylmethane, and dimethyldiaminodicyclohexylmethane); heterocyclic polyamines [e.g., piperazine and aminoalkyl-substituted piperazine (e.g., aminoethylpiperazine)]; and mixtures of two or more thereof.

The number average molecular weight of the polyamide resin containing an N-sulfoamino acid is normally within the range of 3,000–200,000 or, preferably, within the range of 5,000–100,000.

Examples of the vinyl polymer containing an N-sulfoamino group include copolymers made from a known radically polymerizable monomer and a vinyl monomer containing an N-sulfoamino group.

Examples of the vinyl monomer containing an N-sulfoamino group include N-sodiosulfoaminopropylene and N-allyll-N'-sodiosulfoaniline.

The monomer containing an N-sulfoamino group may be obtained, for example, when a vinyl monomer containing a primary or secondary amino group is reacted with pyridine/ sulfur trioxide complex in an aqueous alkali solution at a temperature of about 0°–40° C. and then the reaction product is purified by the recrystallization from ethanol or acetone.

Examples of the known radically polymerizable monomer include methyl (meth)acrylate, ethyl (meth)acrylate, propyl (meth)acrylate, butyl (meth)acrylate, 2-hydroxyethyl (meth) acrylate, 2-hydroxypropyl (meth)acrylate, glycidyl (meth) acrylate, styrene, maleic acid, maleic anhydride, (meth) acrylic acid, fumaric acid, dibutyl fumarate, vinyl chloride, vinyl acetate, vinyl propionate, vinylidene chloride, and acrylonitrile.

The vinyl polymer containing an N-sulfoamino group may be obtained, for example, when the radically polymerizable monomer containing an N-sulfoamino group and a known radically polymerizable monomer are polymerized in an organic solvent in the presence of an initiator such as benzoyl peroxide.

The vinyl polymer containing an N-sulfoamino group to be used should have a number average molecular weight of at least 3,000 or, preferably, of at least 5,000.

The magnetic recording medium in accordance with the present invention is mainly composed of a non-magnetic substrate and a magnetic layer. Examples of such a recording medium include a type in which an intermediate layer (e.g., primer layer and undercoat layer) is mounted between the non-magnetic substrate and the magnetic layer, a type in which both surfaces of the non-magnetic substrate respectively have magnetic layers, a type in which magnetic layers having different magnetic characteristic are superposed on each other, a type in which a protective layer is mounted on the magnetic layer, and a type in which a back-coat layer is mounted on the non-magnetic substrate of these types.

Examples of the material used for the non-magnetic substrate include polyesters (e.g., polyethylene terephthalate and polyethylene-2,6-naphthalate); cellulose derivatives (e.g., cellulose triacetate, cellulose diacetate, cellulose acetate butylate, and cellulose acetate propionate); vinyl resins (e.g., polyethylene, polypropylene, polyvinyl chloride, and polyvinylidene chloride); other plastics (e.g., polycarbonate, polyimide, and polyamide imide); non-magnetic metals (e.g., aluminum, copper, tin, zinc, and non-magnetic alloys containing these metals); ceramics (e.g., glass, earthenware, and porcelain); and paper coated or laminated with polyolefin resins such as polyethylene and ethylene/butene copolymers. The non-magnetic substrate may have any form of film, tape, sheet, disk, card, drum, and the like.

The magnetic layer of the magnetic recording medium in accordance with the present invention is composed of a binder resin which contains the polymer containing an N-sulfoamino group and a magnetic powder, if necessary, as well as a dispersant, a lubricant, an abrasive agent, an antistatic agent, a corrosion inhibitor, and a cross-linking agent.

Examples of the polymer containing an N-sulfoamino group include those previously mentioned. Among others, thermoplastic polyurethane resins and thermoplastic polyester resins containing an N-sulfoamino group are preferable. Examples of binder resins which can be used together with the polymer containing an N-sulfoamino group include synthetic rubber type thermoplastic resins such as vinyl chloride/vinyl acetate copolymer, vinyl chloride/vinyl acetate/vinyl alcohol copolymer, vinyl chloride/vinylidene chloride copolymer, acrylate/acrylonitrile copolymer, polyvinyl fluoride, vinylidene chloride/acrylonitrile copolymer, polyamide resins, polyvinyl butyral, cellulose derivatives, polyurethane resins, polyester resins, and polybutadiene. These other resins may contain a functional group such as carboxyl group, metal sulfonate group, sulfobetaine group, phosphate group, amino group, quaternary ammonium salt group, or the like as a polar group in the resin. Those other polymers may be preferably used in the range of 20–80 weight %.

Examples of the magnetic powder include iron oxide [e.g., $\gamma$-$Fe_2O_3$ (y-hematite)], $CrO_3$ (chromium trioxide), alloy-type magnetic substances [e.g., Co-$\gamma$-$Fe_2O_3$ (e.g., cobalt ferrite and cobalt-doped y-iron oxide) and Fe—Co—Cr alloys], barium ferrite, pure iron Fe (metal powder), iron carbide, and iron nitride. The amount of the powder may be preferably in the range of 1–10, more preferably 3–8 weight %.

Examples of the dispersant include fatty acids having a carbon number of 12–18 (e.g., caprylic acid, capric acid, lauric acid, myristic acid, palmitic acid, stearic acid, oleic acid, elaidic acid, linoleic acid, linolenic acid, and stearoleic acid) and metal soup [alkali metal (e.g., potassium and sodium) and alkali earth metal (e.g., magnesium, calcium, and barium) salts of the above-mentioned fatty acids]. The amount of the dispersant may be preferably in the range of 1–10, more preferably 3–8 weight %.

Examples of the lubricant include dialkylpolysiloxane whose alkyl group has a carbon number of 1–5, dialkoxypolysiloxane whose alkoxy group has a carbon number of 1–4, monoalkyl (with a carbon number of 1–5 in alkyl group) monoalkoxy (with a carbon number of 1–4 in alkoxy group) polysiloxane, phenylpolysiloxane, fluoroalkylpolysiloxane, silicone oil, electrically conductive fine particles (e.g., graphite), inorganic powders (e.g., molybdenum disulfide and tungsten disulfide), plastic fine particles, fatty acid esters, and fluorocarbons. The amount of the lubricant may be preferably in the range of 1–10, more preferably 3–8 weight %.

Examples of the abrasive agent include alumina, silicon carbide, chromium oxide, corundum, synthetic corundum, diamond, and synthetic diamond. The amount of the abrasive agent may be preferably in the range of 1–10, more preferably 3–8 weight %.

Examples of the antistatic agent include electrically conductive powders (e.g., carbon black and carbon black graft polymers), natural surfactants (e.g., saponin), nonionic surfactants (e.g., alkylene oxide type, glycerine type, and glycidol type), cationic surfactants (e.g., higher alkylamine type, quaternary ammonium salt type, heterocyclic type of pyridine or the like, and phosphonium type), anionic surfactants (e.g., carboxylate salt type, sulfonate salt type, phosphate salt type, sulfate salt type, phosphate ester salt type), and ampholytic surfactants (e.g., amino acid type, amino sulfate type, and aminoalcohol sulfate or phosphate type). The amount of the antistatic agent may be preferably in the range of 1–10, more preferably 3–8 weight %.

Examples of the corrosion inhibitor include phosphoric acid, sulfides, amines (e.g., guanidine and pyridine), urea, zinc chromate, calcium chromate, and strontium chromate. In particular, when a volatile corrosion inhibitor (i.e., an inorganic or organic acid salt of amine, amide, or imide) such as dicyclohexylamine nitrite, cyclohexylamine chromate, diisopropylamine nitrite, diethanol amine phosphate, cyclohexylammonium carbonate, propylenediamine stearate, guanidine carbonate, triethanolamine nitrite, or morpholine stearate is used, the corrosion-inhibiting effect is improved. The amount of the corrosion inhibitor may be preferably in the range of 1–10, more preferably 3–8 weight %.

Examples of the cross-linking agent include polyisocyanates. Examples of preferable polyisocyanates include denatured MDI [e.g., "Millionate ME" (manufactured by Hodogaya Kagaku) or 3,3'-dimethoxy-4,4'-diisocyanate] and NCO-group terminated prepolymers [e.g., "Desmodur L" (manufactured by Bayer) and "Coronate HL" (manufactured by Nippon Polyurethane Kogyo)] derived from a polyisocyanate (TDI, MDI, or the like) and an active hydrogen compound (low molecular weight polyol, polyamine, polyether polyol, polyester polyol, or the like).

Normally, 3–40 parts, preferably 10–30, by weight of the cross-linking agent is used with respect to 100 parts by weight of the binder resin. Also, in order to accelerate the cross-linking reaction, catalysts such as those used for making the above-mentioned polyurethane resin may be compounded therein when necessary.

The magnetic recording medium in accordance with the present invention may be obtained by a method comprising the steps of mixing the above-mentioned binder resin, magnetic powder, and solvent, if necessary, together with the above-mentioned additives, in a premixer or the like; further mixing and dispersing the resulting mixture in a mixing and dispersing apparatus (e.g., ball mill, paint conditioner, sand grinder, sand mill, and blast mill); coating the resulting magnetic coating on the non-magnetic substrate by a doctor-blade technique, a transfer-printing technique (e.g., gravure technique and reverse-roll technique), or the like so as to attain a dried film thickness of 0.1–10 μm, preferably 0.1–25 μm; and then subjecting the coating to such processes as orientation, drying, surface processing, separation, and winding.

Examples of the solvent include ester solvents (e.g., ethyl acetate and butyl acetate), ether solvents (e.g., dioxane and tetrahydrofuran), ketone solvents (e.g., cyclohexanone, methyl ethyl ketone, and methyl isobutyl ketone), aromatic hydrocarbon solvents (e.g., toluene and xylene), and mixed solvents of two or more thereof. Among others, mixed solvents made of a ketone solvent and an aromatic hydrocarbon solvent are preferable. In this case, the solvent is normally used in an amount by which the solid content of the magnetic coating is within the range of 20–80% by weight.

In the magnetic recording medium in accordance with the present invention, on the surface of the non-magnetic substrate opposite to the magnetic layer, a back-coat layer comprising a polymer containing an N-sulfoamino group and a non-magnetic pigment, if necessary, as well as a friction-reducing agent and a cross-linking agent, may be mounted.

Examples of the polymer containing an N-sulfoamino group constituting the back-coat layer include those previously mentioned. In view of the travelling, travelling durability, signal-to-noise ratio, and drop-out improved thereby, the polyurethane resins and polyester resins containing an N-sulfoamino group are preferable.

The polymer containing an N-sulfoamino group constituting the back-coat layer may be used together with other resins. For example, cellulose resins such as nitrocellulose may be used therewith. The amount of the other resins may preferably be in the range of 20–80 weight %.

Examples of the non-magnetic pigment include carbon black and inorganic fine powders having a Mohs' hardness of not less than 5 such as titanium oxide, alumina, zirconia, chromium trioxide, and iron trioxide. Carbon black to be used should preferably have an average particle diameter of 0.04–0.08 μm. The non-magnetic pigments other than carbon black should preferably have an average particle diameter of 0.2–0.3 μm. As the non-magnetic pigment, carbon black and the inorganic fine powder having a Mohs' hardness of not less than 5 are preferably used together.

Examples of the friction-reducing agent include fatty acids or fatty acid esters having a carbon number of not less than 12. The amount of the agent may be preferably 1–10, more preferably 3–8 weight %.

Examples of the cross-linking agent include polyisocyanates.

The back-coat layer should preferably contain 100–300% by weight of carbon black with respect to the binder resin which contains the polymer containing an N-sulfoamino group. Preferably, 5–40% by weight of the inorganic fine powder having a Mohs' hardness of not less than 5 is used with respect to carbon black.

The back-coat layer may be formed by a method comprising the steps of compounding the polymer containing an N-sulfoamino group and the non-magnetic pigment, if necessary, together with the friction-reducing agent and the cross-linking agent; sufficiently kneading and dispersing the resulting mixture in a solvent such as methyl ketone to form a coating; applying thus formed coating to the back surface of the non-magnetic substrate which has the magnetic layer on the front surface, such that the thickness of the coating after drying is 0.3–1.5 μm; and then drying the coating.

In the following, the present invention will further be explained with reference to EXAMPLES which will not restrict the present invention. In the following, parts and % indicate parts by weight and % by weight, respectively,

EXAMPLES

The molecular weight distribution in the present invention was measured by a gel permeation chromatography (GPC) technique (Showa Denko Co. SYS-11 GPC apparatus) with THF as an elution solvent, measurement temperature of 40° C., two of GMHXL column(Tosoh Co.), and polystyrene as a molecular weight standards- The sample concentration was around 0.5w %.

The intrinsic viscosity was measured by an Ubbelohde's viscometer in phenol/tetrachloroethane (60/40 w/w) at 25→C. The sample solution of 0.1–0.5 g/dl was prepared. These diluted solution was measured by the viscometer in a thermostatic bath at the temperature.

EXAMPLE 1

In a reaction vessel equipped with a stirrer, a thermometer, and a reflux condenser, 1 mol of 2-amino- 1,3-propanediol was dissolved in 1,250 ml of water. While the resulting solution was stirred, 1 mol of pyridine/sulfur trioxide complex was divisionally introduced therein in a period of about 2 hours so as to effect a reaction. During this period, the pH in the system was maintained at about 9–10 by 10% aqueous sodium hydroxide solution. After the reaction mixture was condensed to about 1,000 ml, sodium chloride (0.17 mol) was added thereto. Then, 5,000 ml of ethanol was added thereto to yield a white precipitate, which was thereafter filtered out. To the filtrate, 4,000 ml of acetone was added to yield a white precipitate. It was filtered and dried to yield a white crystal (A-1). The structure of A-1 was confirmed by NMR and IR analyses as $(HOCH_2)_2CHNHSO_3Na$ (J. Org. Chem., 23, 1133 (1958)).

In a reaction vessel equipped with a stirrer, a thermometer, and a reflux condenser, 1 mol of adipic acid, 1 mol of isophthalic acid, 1.5 mol of ethylene glycol, 1.5 mol of neopentyl glycol, and 0.017 mol of the white crystal (A-1) were subjected to esterification at 160°–220° C. to yield a polyester polyol (B-1) having a hydroxyl value of 112.

In a reaction vessel equipped with a stirrer, a thermometer, and a reflux condenser, 1 mol of the above-mentioned polyester polyol (B-1), 1 mol of neopentyl glycol, and 2 mol of diphenylmethane diisocyanate were reacted at about 80° C. After the end of the reaction, the reaction product was diluted with methyl ethyl ketone to yield a polyurethane resin solution (I) having a final solid content of 30%. Thus obtained polyurethane resin exhibited an N-sulfoamino group content of 20 equivalents per $10^6$ g of the resin and a number average molecular weight of 15,000.

EXAMPLE 2

In a reaction vessel equipped with a stirrer, a thermometer, and a reflux condenser, 0.45 mol of terephthalic acid, 0.43 mol of isophthalic acid, 0.12 mol of adipic acid, 0.73 mol of ethylene glycol, 0.75 mol of neopentyl glycol, and 0.02 mol of the white crystal (A-1) were introduced together with 0.1 part of dibutyltin oxide and subjected to an esterification reaction at 140°–220° C. while being stirred. Then, 0.1 part of antimony trioxide was added thereto and the mixture was subjected to condensation in a reduced pressure of not more than 1 mmHg at 220°–260° C. The finally-obtained polyester resin (II) exhibited a number average molecular weight of 12,000 and an N-sulfoamino group content of 80 equivalents per $10^6$ g of the resin.

EXAMPLE 3

In a reaction vessel equipped with a stirrer, a thermometer, and a reflux condenser, 1 mol of diethanolamine was dissolved in 1,250 ml of water. While the resulting solution was stirred, 1 mol of pyridine/sulfur trioxide complex was divisionally introduced therein at room temperature in a period of about 2 hours so as to effect a reaction. During this period, the pH in the system was maintained at about 9–10 by 10% aqueous sodium hydroxide solution. After the reaction mixture was condensed to about 1,000 ml, sodium chloride (0.17 mol) was added thereto. Then, 5,000 ml of ethanol was added thereto to yield a white precipitate, which was thereafter filtered out. To the filtrate, 4,000 ml of acetone was added to yield a white precipitate. It was filtered and dried to yield a white crystal (A-2). The structure of A-2 was confirmed by NMR and IR analyses as $(HOC_2H_4)_2NSO_3Na$.

In a reaction vessel equipped with a stirrer, a thermometer, and a reflux condenser, 1 mol of adipic acid, 1 mol of isophthalic acid, 1.5 mol of ethylene glycol, 1.5 mol of neopentyl glycol, and 0.017 mol of the white crystal (A-2) were subjected to esterification at 160°–220° C. to yield a polyester polyol (B-2) having a hydroxyl value of 112.

In a similar reaction vessel, 1 mol of the above-mentioned polyester polyol (B-2), 1 mol of neopentyl glycol, and 2 mol of diphenylmethane diisocyanate were reacted at about 80° C. After the end of the reaction, the reaction product was diluted with methyl ethyl ketone to yield a polyurethane resin solution (III) having a final solid content of 30%. Thus obtained polyurethane resin exhibited an N-sulfoamino group content of 20 equivalents per $10^6$ g of the resin and a number average molecular weight of 14,000.

EXAMPLE 4

In a reaction vessel equipped with a stirrer, a thermometer, and a reflux condenser, 0.45 mol of terephthalic acid, 0.43 mol of isophthalic acid, 0.12 mol of adipic acid, 0.73 mol of ethylene glycol, 0.75 mol of neopentyl glycol, and 0.02 mol of the white crystal (A-2) were introduced together with 0.1 part of dibutyltin oxide and subjected to an esterification reaction at 140°–220° C. while being stirred. Then, 0.1 part of antimony trioxide was added thereto and the mixture was subjected to a condensation in a reduced pressure of not more than 1 mmHg at 220°–260° C. Thus obtained polyester resin (IV) exhibited a number average molecular weight of 13,000 and an N-sulfoamino group content of 80 equivalents per $10^6$ g of the resin.

EXAMPLE 5

In a reaction vessel equipped with a stirrer and a thermometer, 1 mol of (A-2), 600 parts of xylene, and 3 parts of potassium hydroxide were introduced and then 8 mol of propylene oxide was blown thereinto in a period of about 8 hours so as to effect a reaction. Thus, a propylene oxide addition product (D-1) was obtained. Then, in a reaction vessel equipped with a stirrer, a thermometer, and a reflux condenser, 0.42 mol of (D-1), 1 mol of a polyester diol having a number average molecular weight of 2,000 (i.e., reaction product made by 5 mol of isophthalic acid, 2 mol of phthalic acid, 5 mol of neopentyl glycol, and 2 mol of 1,4-cyclohexanedimethanol), and 0.38 mol of dimethylmethane diisocyanate were charged and reacted at about 80° C. After the end of the reaction, methyl ethyl ketone was added thereto to yield a polyurethane resin solution (V) having a concentration of 30%. Thus obtained polyurethane resin exhibited an N-sulfoamino group content of 150 equivalents per $10^6$ g of the resin and a number average molecular weight of 13,000.

EXAMPLE 6

The ingredients listed below were mixed in a ball mill for 70 hours and filtered. Then 5 parts of a curing agent ["Coronate L" (manufactured by Nippon Urethane Kogyo), i.e., 3-mole tolylene diisocyanate addition product of trimethylolpropane] was added to the filtrate. The resulting mixture was mixed for 30 minutes to yield a magnetic coating.

| | |
|---|---|
| Co-γ-Fe$_2$O$_3$ | 100 parts |
| Polyurethane resin solution (I) (converted to solid content) | 10 parts |
| Vinyl chloride/vinyl acetate copolymer | 10 parts |
| Stearic acid | 1 part |
| Butyl stearate | 1 part |
| Methyl ethyl ketone | 75 parts |
| Toluene | 75 parts |

This magnetic coating was applied to a polyester film so as to attain a dried film thickness of 5 μm, oriented by a magnetic field of 1,000 Oe applied thereto, and then pressed by a calender roll to yield a magnetic tape (I-1). The gloss and squareness ratio of thus obtained magnetic tape were measured. The results are shown in TABLE 1. The gloss was determined by a gloss meter (type number VGS-1-D manufactured by Nihon Denshyoku Kogyo K. K.). The measuring angle was an incident angle/reflection angle of 60°/60°. The squareness ratio was indicated by the ratio between saturation magnetization Bm and remanent magnetization Br, i.e., value of ratio Br/Bm. The squareness ratio was measured by a vibration sample type magnetometer (type number BHV-30 manufactured by Riken Denshi Kogyo K. K.). Measuring conditions were: H full scale 5000 Oe, Sk percent 90%, H-mult range 1, Sweep speed 5 minutes, M-full scale 0.05 emu, Sample shape 1 cm×1 cm square, magnetizable layer thickness 2.7 μm.

EXAMPLE 7

A magnetic tape (II-1) was obtained in the same manner as EXAMPLE 6 except that the polyester resin (II) was used in lieu of the polyurethane resin solution (I). The gloss and squareness ratio of thus obtained magnetic tape were measured in the same manner as EXAMPLE 6. The results are shown in TABLE 1.

EXAMPLE 8

A magnetic tape (III-1) was obtained in the same manner as EXAMPLE 6 except that the polyurethane resin solution (III) was used in lieu of the polyurethane resin solution (I). The gloss and squareness ratio of thus obtained magnetic tape were measured in the same manner as EXAMPLE 6. The results are shown in TABLE 1.

EXAMPLE 9

A magnetic tape (IV-1) was obtained in the same manner as EXAMPLE 6 except that the polyester resin (IV) was used in lieu of the polyurethane resin solution (I). The gloss and squareness ratio of thus obtained magnetic tape were measured in the same manner as EXAMPLE 6. The results are shown in TABLE 1.

EXAMPLE 10

A magnetic tape (V-1) was obtained in the same manner as EXAMPLE 6 except that the polyurethane resin solution (V) was used in lieu of the polyurethane resin solution (I). The gloss and squareness ratio of thus obtained magnetic tape were measured in the same manner as EXAMPLE 6. The results are shown in TABLE 1.

EXAMPLE 11

The ingredients listed below were mixed in a ball mill for 60 hours and then 10 parts of "Coronate L" (i.e., polyisocyanate manufactured by Nippon Urethane Kogyo) was added thereto to yield a coating for forming a back-coat layer.

| | |
|---|---|
| Carbon black | 90 parts |
| Titanium oxide (Mohs' hardness: 6 average particle diameter: 0.25 μm) | 10 parts |
| Polyurethane resin solution (V) (solid content) | 50 parts |
| Methyl ethyl ketone | 200 parts |
| Cyclohexane | 25 parts |

Thus obtained coating was applied to the back surface of the polyester film of the magnetic tape (I-1), whose front surface had been coated with the magnetic layer, to form a back-coat layer with a film thickness of 1 μm. The magnetic tape coated with thus formed back-coat layer was run in a commercially-available home video tape recorder for 400 times at room temperature and then the surface of the back-coat layer was inspected by eyes to evaluate the durability thereof. The case where shavings (drop-outs) were hardly perceivable, the case where shavings were clearly perceivable, and the case where shavings were remarkable are indicated by "O", "Δ", and "X", respectively. The results are shown in TABLE 2.

EXAMPLE 12

In a four-neck flask, 1,619 g of terephthalic acid and 2,380 g of ethylene glycol were charged and heated in a nitrogen atmosphere for 4 hours at 198° C. while being stirred. After the resulting mixture was cooled to 180° C., 380 g of 18-mol ethylene oxide addition product of soda sulfamate having a number average molecular weight of 1,000, 0.24 g of manganese acetate, 15.6 g of lithium acetate, and 0.48 g of antimony trioxide were added thereto. Then, the mixture was heated to 240° C. in a period of 2 hours 30 minutes while being stirred. After the mixture was cooled to 180° C. again, 0.2 g of phosphoric acid was added thereto. Then, the mixture was heated again to 260° C. while being stirred. Thereafter, at the same temperature, the pressure was reduced to eliminate unreacted ethylene glycol to yield a polyester resin in accordance with the present invention. This resin exhibited an N-sulfoamino group content of 157.6 equivalents/$10^6$ g of the resin. Its intrinsic viscosity was 0.55 dl/g when measured in a mixed solvent of phenol/tetrachloroethane (with a weight ratio of 60/40) at 25° C.

EXAMPLE 13

The polyester resin of EXAMPLE 12 was introduced into an extruder-type melt spinning machine having a 0.5-mm diameter spinning nozzle and discharged at a rate of about 3 g/minute at a spinning temperature of 280° C. The discharged yarn was wound at a rate of 1,000 m/minute at a position which was directly 2.5 m below the nozzle. The wound yarn was extended and thermally processed by a feed roller at 80° C. and a plate heater at 180° C., with a draw ratio corresponding to a final extended yarn ductility of 30%, to yield an extended yarn. Thus extended yarn exhibited a strength of 4.9 g/d. This extended yarn was colored for 90 minutes in a bath having 5.0 owf of Sevron Blue (i.e., cationic dye manufactured by Dupon Corp.) and 0.2 g/l each of acetic acid and sodium acetate (with a bath ratio of 1:100) under atmospheric boiling. The absorbance values of the dye solution before and after the coloring were measured to determine its degree of exhaustion. The results are shown in TABLE 3. Also, about 10 g of the extended yarn was dried for 3 hours at 105° C. and then weighed. Then, thus dried extended yarn was left in a 25° C., 95%-RH thermohygrostat until an equilibrium was achieved (normally for 4–5 days) and then weighed. From thus obtained weights, the hygroscopic degree was determined by the following method. The results are shown in TABLE 3.

hygroscopic degree=[{weight of fiber moisturized until equilibrium was achieved—weight of fiber dried for 3 hours at 105° C.)}/weight of fiber dried for 3 hours at 105° C.]×100(%)

EXAMPLE 14

In a reaction vessel, 20 mol of terephthalic acid and 19 mol of ethylene glycol were charged and then heated for 4 hours at 198° C. in nitrogen atmosphere while being stirred. After the resulting mixture was cooled to 180° C., 1 mol of 2-potassiosulfoamino-1, 3-propanediol, 0.24 g of manganese acetate, 15.6 g of lithium acetate, and 0.48 g of antimony trioxide were added thereto. Then, the mixture was heated to 240° C. in a period of 2 hours 30 minutes while being stirred. After the mixture was cooled to 180° C. again, 0.2 g of phosphoric acid was added thereto. Then, the mixture was heated again to 260° C. while being stirred. Thereafter, at the same temperature, the pressure was reduced to eliminate unreacted ethylene glycol to yield a polyester resin containing 2.5 mol % of 2-potassiosulfoamino-1,3-propanediol in accordance with the present invention. This resin exhibited an N-sulfoamino group content of 255 equivalents/$10^6$ g of the resin. Its intrinsic viscosity was 0.56 dl/g when measured in a mixed solvent of phenol/tetrachloroethane (with a weight ratio of 60/40) at 25° C.

EXAMPLE 15

Like EXAMPLE 13, an extended yarn of polyester fiber was obtained from the polyester resin of EXAMPLE 14. The strength of this yarn was 5.3 g/d. Its degree of exhaustion and hygroscopicity were measured in the same manner as EXAMPLE 13. The results are shown in TABLE 3.

EXAMPLE 16

A polyester resin containing 2.5 mol% of 2-sodiosulfoaminoterephthalic acid was obtained in the same manner as EXAMPLE 14 except that 19 mol of terephthalic acid, 0.1 mol of 2-sodiosulfoaminoterephthalic acid, and 20 mol of ethylene glycol were used. Thus obtained resin exhibited an N-sulfoamino group content of 247.7 equivalents/$10^6$ g of the resin. Its intrinsic viscosity was 0.53 dl/g when measured in a mixed solvent of phenol/tetrachloroethane (with a weight ratio of 60/40) at 25° C.

EXAMPLE 17

Like EXAMPLE 13, an extended yarn of polyester fiber was obtained from the polyester resin of EXAMPLE 16. The strength of this yarn was 5.2 g/d. Its degree of exhaustion and hygroscopicity were measured in the same manner as EXAMPLE 13. The results are shown in TABLE 3.

EXAMPLE 18

A polyester resin containing 20 mol % of 2-sodiosulfoamino-1,3-propanediol was obtained in the same manner as EXAMPLE 14 except that 20 mol of terephthalic acid and 8 mol of 2-sodiosulfoamino-1,3-propanediol were used. Thus obtained resin exhibited an N-sulfoamino group content of 1,623 equivalents/$10^6$ g of the resin. Its intrinsic viscosity was 0.68 dl/g when measured in a mixed solvent of phenol/tetrachloroethane (with a weight ratio of 60/40) at 25° C.

EXAMPLE 19

Like EXAMPLE 13, an extended yarn of polyester fiber was obtained from the polyester resin of EXAMPLE 18. The strength of this yarn was 4.9 g/d. Its degree of exhaustion and hygroscopicity were measured in the same manner as EXAMPLE 13. The results are shown in TABLE 3.

EXAMPLE 20

A polyester resin containing 20 mol % of 2-sodiosulfoamino-1,3-propanediol was obtained in the same manner as EXAMPLE 14 except that 20 mol of terephthalic acid, 19.8 mol of ethylene glycol, and 0.2 mol of 2-sodiosulfoamino-1,3-propanediol were used. Thus obtained resin exhibited an N-sulfoamino group content of 52.8 equivalents/$10^6$ g of the resin. Its intrinsic viscosity was 0.45 dl/g when measured in a mixed solvent of phenol/ tetrachloroethane (with a weight ratio of 60/40) at 25° C.

EXAMPLE 21

Like EXAMPLE 13, an extended yarn of polyester fiber was obtained from the polyester resin of EXAMPLE 20. The strength of this yarn was 5.3 g/d. Its degree of exhaustion and hygroscopicity were measured in the same manner as EXAMPLE 13. The results are shown in TABLE 3.

COMPARATIVE EXAMPLE 1

In a reaction vessel equipped with a stirrer, a thermometer, and a reflux condenser, 1 mol of adipic acid, 1 mol of isophthalic acid, 1.5 mol of ethylene glycol, 0.017 mol of 5-sodiosulfoisophthalic acid, and 1.5 mol of neopentyl glycol were subjected to esterification at 160°–220° C. to yield a polyester polyol (C) having a hydroxyl value of 112.

In a reaction vessel equipped with a stirrer, a thermometer, and a reflux condenser, 1 mol of the above-mentioned polyester polyol (C), 1 mol of neopentyl glycol, and 2 mol of diphenylmethane diisocyanate were reacted at about 80° C. After the end of the reaction, the reaction product was diluted with methyl ethyl ketone to yield a polyurethane resin solution (VI) having a solid content of 30%. Thus obtained polyurethane resin exhibited a sodium sulfonate group content of 22 equivalents per $10^6$ g of the resin and a number average molecular weight of 16,000.

A comparative magnetic tape (VI-1) was made in the same manner as EXAMPLE 6 except that the above-mentioned polyurethane resin solvent (VI) was used in lieu of the polyurethane resin solution (I). Then, the gloss and squareness ratio of thus obtained magnetic tape were measured in the same manner as EXAMPLE 6. The results are shown in TABLE 1.

COMPARATIVE EXAMPLE 2

In a reaction vessel equipped with a stirrer, a thermometer, and a reflux condenser, 0.45 mol of terephthalic acid, 0.43 mol of isophthalic acid, 0.12 mol of adipic acid, 0.02 mol of 5-sodiosulfoisophthalic acid, 0.73 mol of ethylene glycol, and 0.75 mol of neopentyl glycol were charged together with 0.1 part of dibutyltin oxide and subjected to an esterification reaction at 140°–220° C. while being stirred. Then, 0.1 part of antimony trioxide was added thereto and the mixture was subjected to condensation in a reduced pressure of not more than 1 mmHg at 220°–260° C. to yield a polyester resin (VII). It exhibited a number average molecular weight of 13,000 and a sodium sulfonate group content of 82 equivalents per $10^6$ g of the resin.

A comparative magnetic tape (VII-1) was made in the same manner as EXAMPLE 6 except that the above-mentioned polyester resin (VII) was used in lieu of the polyurethane resin solution (I). Then, the gloss and squareness ratio of thus obtained magnetic tape were measured in the same manner as EXAMPLE 6. The results are shown in TABLE 1.

COMPARATIVE EXAMPLE 3

A back-coat layer was formed on the back surface of the polyester film of the magnetic tape (VII-1), whose front surface had been coated with the magnetic layer, in the same manner as EXAMPLE 10 except that the polyester resin (VII) was used in lieu of the polyurethane resin solution (V). Its results of measurement are shown in TABLE 2.

COMPARATIVE EXAMPLE 4

A polyester resin containing 2.5 mol % of 5-sodiosulfoisophthalic acid was obtained in the same manner as EXAMPLE 14 except that 19 mol of terephthalic acid, 20 mol of ethylene glycol, and 0.2 mol of 5-sodiosulfoisophthalic acid were used. Its intrinsic viscosity was 0.35 d/g when measured in a mixed solvent of phenol/tetrachloroethane (with a weight ratio of 60/40) at 25° C. An extended yarn of polyester fiber was obtained from this resin in the same manner as EXAMPLE 13. The strength of thus obtained yarn was 4.0 g/d. Its degree of exhaustion and hygroscopicity were measured in the same manner as EXAMPLE 13. The results are shown in TABLE 3.

TABLE 1

|  | Gloss (%) | Squareness ratio |
| --- | --- | --- |
| EXAMPLE 6 | 98 | 0.83 |
| EXAMPLE 7 | 99 | 0.84 |
| EXAMPLE 8 | 97 | 0.83 |
| EXAMPLE 9 | 96 | 0.83 |
| EXAMPLE 10 | 98 | 0.84 |
| COMP. EXAMPLE 1 | 89 | 0.78 |
| COMP. EXAMPLE 2 | 88 | 0.79 |

TABLE 2

|  | Durability |
| --- | --- |
| EXAMPLE 9 | O |
| EXAMPLE 11 | O |
| COMP. EXAMPLE 3 | Δ–X |

TABLE 3

|  | Deg. of exhaustion | Hygroscopicity |
| --- | --- | --- |
| EXAMPLE 13 | 99% | 10.5% |
| EXAMPLE 15 | 99% | 2.0% |
| EXAMPLE 17 | 98% | 2.1% |
| EXAMPLE 19 | 99% | 13.1% |
| EXAMPLE 21 | 99% | 1.5% |
| COMP. EXAMPLE 4 | 95% | 0.2% |

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application Nos. 6-272997 (272997/1994) filed on Oct. 11, 1994, and 7-078328 (078328/1995) filed on Mar. 8, 1995, are hereby incorporated by reference.

What is claimed is:

1. A polymer having 1–2000 equivalent of an N-sulfamino group/$10^6$ g of said polymer.

2. A polymer according to claim 1, wherein said polymer has 5–500 equivalent of an N-sulfoamino group/$10^6$ g of said polymer.

3. A polymer according to claim 1, wherein said polymer has a number average molecular weight of 3,000–200,000.

4. A polymer according to claim 1, wherein said N-sulfoamino group is a metal sulfamate group.

5. A polymer according to claim 4, wherein said metal is potassium or sodium.

6. A polymer according to claim 1, wherein said polymer is one of a member selected from the group consisting of polyurethane resins, polyester resins, acrylic resins, polyamide resins, and vinyl chloride polymers.

7. A polymer according to claim 1, wherein said polymer is a polyurethane resin.

8. A polymer according to claim 1, wherein said polymer is a polyester resin.

9. A polymer according to claim 7, wherein said polyurethane resin is obtained by a reaction of a polyol containing an N-sulfoamino group with an organic polyisocyanate.

10. A polymer according to claim 9, wherein said polyol is a polyester polyol.

11. A polymer according to claim 9, wherein said polyol is a polyether polyol.

12. A polymer according to claim 8, wherein said polyester resin is obtained by a reaction of a polyol containing an N-sulfoamino group with a polycarboxylic acid.

13. A polymer according to claim 12, wherein said polyol is a polyether polyol.

14. A polymer according to claim 12, wherein said polycarboxylic acid is an aromatic polycarboxylic acid.

15. A polymer according to claim 8, wherein said polyester resin is a polyester resin having a fiber-forming property obtained by a reaction of a diol containing an N-sulfoamino group with an alkylene glycol and an aromatic dicarboxylic acid.

16. A fiber formed by the polymer according to claim 15.

* * * * *